Oct. 15, 1929.  F. J. ANDEL ET AL  1,731,284

TRAFFIC SIGNAL DETECTOR

Filed Dec. 3, 1927

Inventors
FRANK J. ANDEL
ERNST G. GAUS
By Fisher, Moser & Moore
Attorney

Patented Oct. 15, 1929

1,731,284

UNITED STATES PATENT OFFICE

FRANK J. ANDEL AND ERNST G. GAUS, OF CLEVELAND, OHIO

TRAFFIC-SIGNAL DETECTOR

Application filed December 3, 1927. Serial No. 237,565.

Our invention relates to traffic signal detectors, and the object of the invention in general is to provide a simple lens attachment for automobiles, whereby the rays of a traffic signal light as commonly used at the intersection of streets and highways may be refracted at various angles of deviation and become visible to the driver of an automobile when a direct view of the signal light is obstructed or cut off by the top or other part of the car.

Figure 1:
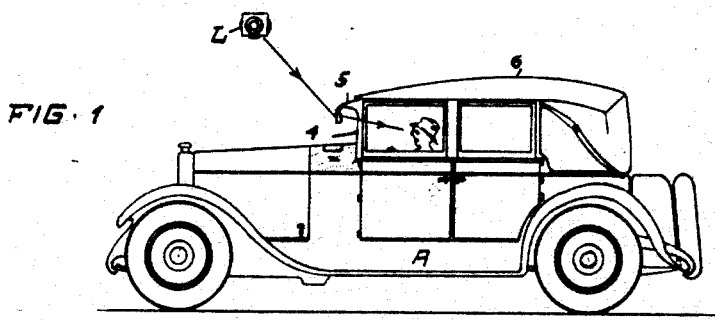
Figure 2:
Figure 3:
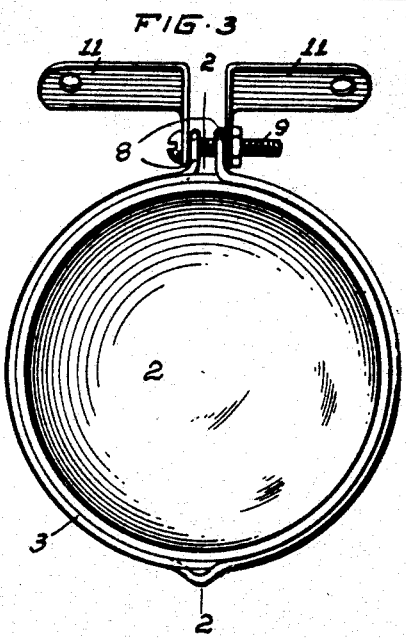
Figure 4:
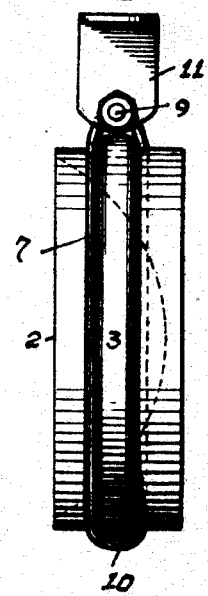
Figure 5:
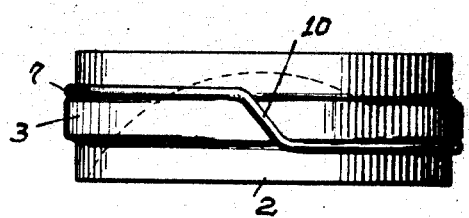

In the accompanying drawing, Fig. 1 is a side view of an automobile having a traffic signal detector of my invention attached to the visor above the windshield of the car. Fig. 2 is a vertical section of the detector on a larger scale, Fig. 3 a face view, Fig. 4 a side elevation, and Fig. 5 an edge view thereof.

The invention comprises a plano-concavo glass lens 2 having a peripheral rib 3 adapted to permit convenient attachment of the lens to some stationary part of an automobile A, preferably in advance of the windshield 4. In Fig. 1 lens 2 is shown suspended from the visor or overhanging front end 5 of the top 6 of automobile A immediately in front of the driver where it may be constantly seen and observed but will not obstruct the view ahead in any way. As suspended lens 2 will refract the ray of light from a traffic signal lamp —L— having vari-colored lenses, because such lamps are usually overhead and the automobile approaches and stops at different angles in respect thereto: Accordingly, the driver may sit in a comfortable position without change or shift to stop and start the automobile quickly and safely as the traffic signal directs, without being obliged to have the traffic signal lamp itself in the direct line of his vision. The ribbed periphery of lens 2 is encircled by a wire clamping ring 7 which is split or divided and provided with bent loops or eyes 8—8 at its extremities to permit a clamping bolt or screw 9 to be inset to contract the ring and fasten the lens tightly but removably therein. Wire ring 7 has an offset bend 10 therein diametrically opposite its bent clamping extremities 8—8, which offset 10 places the respective half circles of the ring in different planes and in position to engage the opposite sides of the central rib or flange 3 of lens 2, thereby providing a secure lock for the lens. A pair of right-angled brackets or supporting members 11—11, support the clamping bolt or screw 9, and the lens supporting ring is clamped frictionally between said members to permit the lens to swing or turn to a vertical or inclined position as the driver may elect or his position in the seat may require to better observe the refracted light in the curved surface of the lens.

What we claim, is:

1. A traffic signal detector, comprising a plano-concavo lens having a peripheral rib, and a clamping device interlocked with said rib and adapted to support said lens upon an automobile in plain view of the driver's seat.

2. A traffic signal detector, comprising a plano-concavo lens having a peripheral rib, and a wire clamping ring for said lens having bent extremities, and means including a clamping bolt adapted to secure said ring and lens in a pivotal position upon a portion of an automobile in plain view of the driver's seat.

3. A traffic signal detector, comprising a plano-concavo lens having a central rib at its periphery, and a wire supporting ring for said lens offset between its extremities adapted to engage opposite sides of said rib.

4. A traffic signal detector, comprising a plano-concavo lens having a peripheral rib, a wire ring having looped extremities and a bent offset middle portion adapted to permit circular portions of the ring to embrace opposite sides of said rib, and clamping and supporting means for said looped extremities.

In testimony whereof we affix our signatures.

FRANK J. ANDEL.
ERNST G. GAUS.